US011908372B2

(12) United States Patent
Jun et al.

(10) Patent No.: US 11,908,372 B2
(45) Date of Patent: Feb. 20, 2024

(54) DEVICE AND METHOD FOR PROCESSING IMAGE DATA FOR DRIVING DISPLAY PANEL

(71) Applicant: SILICON WORKS CO., LTD., Daejeon (KR)

(72) Inventors: Young Jun Jun, Daejeon (KR); Hee Yeol Lee, Daejeon (KR); Young Seo Yoon, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 148 days.

(21) Appl. No.: 17/698,278

(22) Filed: Mar. 18, 2022

(65) Prior Publication Data

US 2022/0208069 A1 Jun. 30, 2022

Related U.S. Application Data

(62) Division of application No. 17/136,669, filed on Dec. 29, 2020, now Pat. No. 11,308,851.

(30) Foreign Application Priority Data

Jan. 2, 2020 (KR) ........................ 10-2020-0000228

(51) Int. Cl.

*G09G 3/20* (2006.01)
*G09G 3/3225* (2016.01)

(52) U.S. Cl.

CPC ......... *G09G 3/2074* (2013.01); *G09G 3/3225* (2013.01); *G09G 2320/029* (2013.01); *G09G 2320/0233* (2013.01); *G09G 2320/0242* (2013.01); *G09G 2320/0626* (2013.01); *G09G 2360/16* (2013.01)

(58) Field of Classification Search

CPC ....... G09G 2360/16; G09G 2320/0233; G09G 3/2074; G09G 2320/0626

See application file for complete search history.

(56) References Cited

U.S. PATENT DOCUMENTS

| | | | | |
|---|---|---|---|---|
| 7,978,201 | B2 * | 7/2011 | Cho | H04N 9/68 345/589 |
| 9,378,682 | B2 * | 6/2016 | Lim | G09G 3/3291 |
| 10,818,039 | B2 * | 10/2020 | Yin | G06T 5/009 |
| 2014/0320546 | A1 * | 10/2014 | Lim | G09G 3/3291 345/77 |
| 2019/0251705 | A1 * | 8/2019 | Yin | H04N 1/40012 |
| 2021/0210009 | A1 * | 7/2021 | Jun | G09G 3/3225 |
| 2022/0208069 | A1 * | 6/2022 | Jun | G09G 3/2074 |

* cited by examiner

*Primary Examiner* — Patrick F Marinelli

(74) *Attorney, Agent, or Firm* — ROTHWELL, FIGG, ERNST & MANBECK, P.C.

(57) ABSTRACT

The present disclosure allows reducing the variation of the luminance depending on the types of images and improving image quality by calculating a plurality of representative values, representing the luminance of pixels so that the types of images can be distinguished, calculating a weight using such representative values, and compensating image data according to the weight.

20 Claims, 9 Drawing Sheets

DEVICE AND METHOD FOR PROCESSING IMAGE DATA FOR DRIVING DISPLAY PANEL

CROSS REFERENCE TO RELATED APPLICATION

This application is a divisional of U.S. patent application Ser. No. 17/136,669 filed on Dec. 29, 2020 which claims priority from Republic of Korea Patent Application No. 10-2020-0000228, filed on Jan. 2, 2020, each of which is hereby incorporated by reference in its entirety.

BACKGROUND

1. Field of Technology

The present disclosure relates to a technology for processing image data for driving a display panel.

2. Description of the Prior Art

As society becomes more and more information-oriented, the demand for products requiring display devices has increased in various ways. Recently, various display devices such as liquid crystal display (LCD) devices, plasma display panels (PDP), organic light emitting diode display (OLED) devices, or the like, are used.

A display device displays an image on a panel by controlling the brightness of each pixel according to received image data. Generally, a self-light-emitting display device, which does not use a backlight, but uses pixels emitting light by themselves, such as an organic light emitting display device, may control the brightness of each pixel by controlling the size of a driving current supplied to the pixel. In such a display device, since the size of a driving current supplied to a pixel is controlled by an analog voltage, a so-called data voltage, converted from image data, the brightness of each pixel may consequently be controlled according to image data.

In order to accurately control the brightness of each pixel using an analog voltage converted from image data in a display device, a driving voltage supplied to each pixel needs to be fixed. In a self-light-emitting display device, for example, an organic light emitting display device, a driving current supplied to each pixel may be controlled using a difference between an analog voltage converted from image data and a driving voltage. Here, when the driving voltage is changed, the difference between the analog voltage and the driving voltage is also changed, and this may lead to a change of a driving current supplied to each pixel and a change of the brightness of each pixel. Such changes of the brightness of pixels may be perceived by a user as a poor image quality.

SUMMARY

An aspect of the present disclosure is to provide a technology for improving image quality by reducing the change of the brightness of pixels. Since the change of the brightness of pixels may be due to the change of driving voltages or driving environments, another aspect of the present disclosure is to provide a technology for reducing the change of the brightness of pixels even when driving voltages or driving environments vary. Since the change of driving voltages or driving environments may depend on image types displayed using image data, still another aspect of the present disclosure is to provide a technology for reducing the change of the brightness of pixels depending on image data or image types.

To this end, in an aspect, the present disclosure provides a method of processing image data, comprising: calculating, as values representing the luminance of pixels disposed on a panel, a first representative value from image data according to a first method and a second representative value from the image data according to a second method different from the first method; calculating a weight using a value derived by applying the first representative value and the second representative value to a lookup table; generating converted image data by applying the weight to the image data; and transmitting the converted image data to a panel driving device for driving the panel.

In the lookup table, intervals of one axis and the other axis may respectively be $2^K$ (K is a natural number).

The first representative value may be calculated according to a first equation comprising, as a factor, a simple equation of grayscale values for pixels or grayscale values for sub-pixels forming a pixel, and the second representative value may be calculated using a second equation comprising, as a factor, a quadratic equation of grayscale values for pixels or grayscale values for sub-pixels forming a pixel.

The first representative value may be calculated according to the first equation comprising, as a factor, a pixel grayscale value obtained by calculating a weighted average of grayscale values of a red (R) sub-pixel, a green (G) sub-pixel, and a blue (B) sub-pixel.

The second representative value may be calculated by dividing the maximum value, among a first square sum obtained by summing up the squares of grayscale values of R sub-pixels, a second square sum obtained by summing up the squares of grayscale values of G sub-pixels, and a third square sum obtained by summing up the squares of grayscale values of B sub-pixels, by the maximum value, among a first sum obtained by summing up the grayscale values of R sub-pixels, a second sum obtained by summing up the grayscale values of G sub-pixels, and a third sum obtained by summing up the grayscale values of B sub-pixels.

The first representative value may be a value calculated by dividing the maximum value, among a first square sum obtained by summing up the squares of grayscale values of R sub-pixels, a second square sum obtained by summing up the squares of grayscale values of G sub-pixels, and a third square sum obtained by summing up the squares of grayscale values of B sub-pixels, by 2^M (M is the number of bits of data indicating grayscale values) and dividing its result by the total number of pixels.

The first representative value may increase as the number of pixels having brightness (which are turned on) increases.

The second representative value may increase as the grayscale values of pixels having brightness (which are turned on) increases.

The first representative value, the second representative value, and the weight may be calculated respectively according to the types of sub-pixels forming a pixel.

The first representative value may be an average of grayscale values of the respective types of sub-pixels, and the second representative value may be calculated by dividing a sum of the squares of the grayscale values of the respective types of sub-pixels by a sum of the grayscale values of the respective types of sub-pixels.

The first representative value may be calculated by dividing a sum of the squares of the grayscale values of the respective types of sub-pixels by the maximum grayscale value or the maximum grayscale value+1 and dividing its result by the total number of the respective types of sub-pixels, and the second representative value may be calculated by dividing a sum of the squares of the grayscale values of the respective types of sub-pixels by a sum of the grayscale values of the respective types of sub-pixels.

In another aspect, the present disclosure provides an image data processing device, comprising: a representative value calculating circuit to calculate values representing the luminance of pixels disposed on a panel, that is, a first representative value from image data according to a first method and a second representative value from the image data according to a second method; a weight calculating circuit to calculate a weight using a lookup table comprising first representative values in an axis and second representative values in the other axis; a weight applying circuit to apply the weight to the image data to generate converted image data; and an image data transmitting circuit to transmit the converted image data to a panel driving device to drive the panel.

The weight calculating circuit may calculate the weight by selecting four candidate values proximate to a pair of a first representative value and a second representative value from the lookup table and applying the interpolation to the four candidate values.

The representative value calculating circuit may calculate a plurality of first representative values and a plurality of second representative values for respective sub-pixels forming a pixel, and the weight calculating circuit may calculate the weight using an average of the plurality of first representative values and an average of the plurality of second representative values.

The panel may be a self-light-emitting display panel.

The weight calculating circuit may calculate a reflection rate of the weight according to a display brightness value (DBV), which is a control value for the brightness of the panel, and the weight applying circuit may apply the weight at the reflection rate to the image data to generate converted image data.

The weight applying circuit may generate the image data as it is as converted image data when the DBV is no less than a predetermined value.

In still another aspect, the present disclosure provides a method of processing image data, comprising: calculating at least one representative value representing the luminance of pixels disposed on a panel; calculating a weight using the at least representative value; calculating a reflection rate of the weight by analyzing the chroma of image date; generating converted image data by applying the weight to the image data at the reflection rate; and transmitting the converted image data to a panel driving device for driving the panel.

When calculating a reflection rate, a device may calculate a chroma analysis value for the image data and apply the chroma analysis value to a reflection rate curve previously stored in order to calculate the reflection rate, wherein the chroma analysis value may be calculated by calculating a difference between the biggest grayscale value and the smallest grayscale value of sub-pixels, obtaining a sum by summing up the differences of grayscale values regarding all pixels, and dividing the sum by the total number of achromatic-colored pixels.

The reflection rate curve may have a characteristic that the reflection rate decreases as the chroma analysis value increases when the chroma analysis value is no more than a first reference value.

The reflection rate curve may have a characteristic that the reflection rate increases as the chroma analysis value increases when the chroma analysis value is no less than a second reference value.

As described above, the present disclosure allows reducing the change of the brightness of pixels to improve image quality. In addition, the present disclosure allows minimizing the change of the brightness of pixels even when driving voltages or driving environments vary and reducing the change of the brightness of pixels depending on image data or image types.

DETAILED DESCRIPTION

Figure 1:
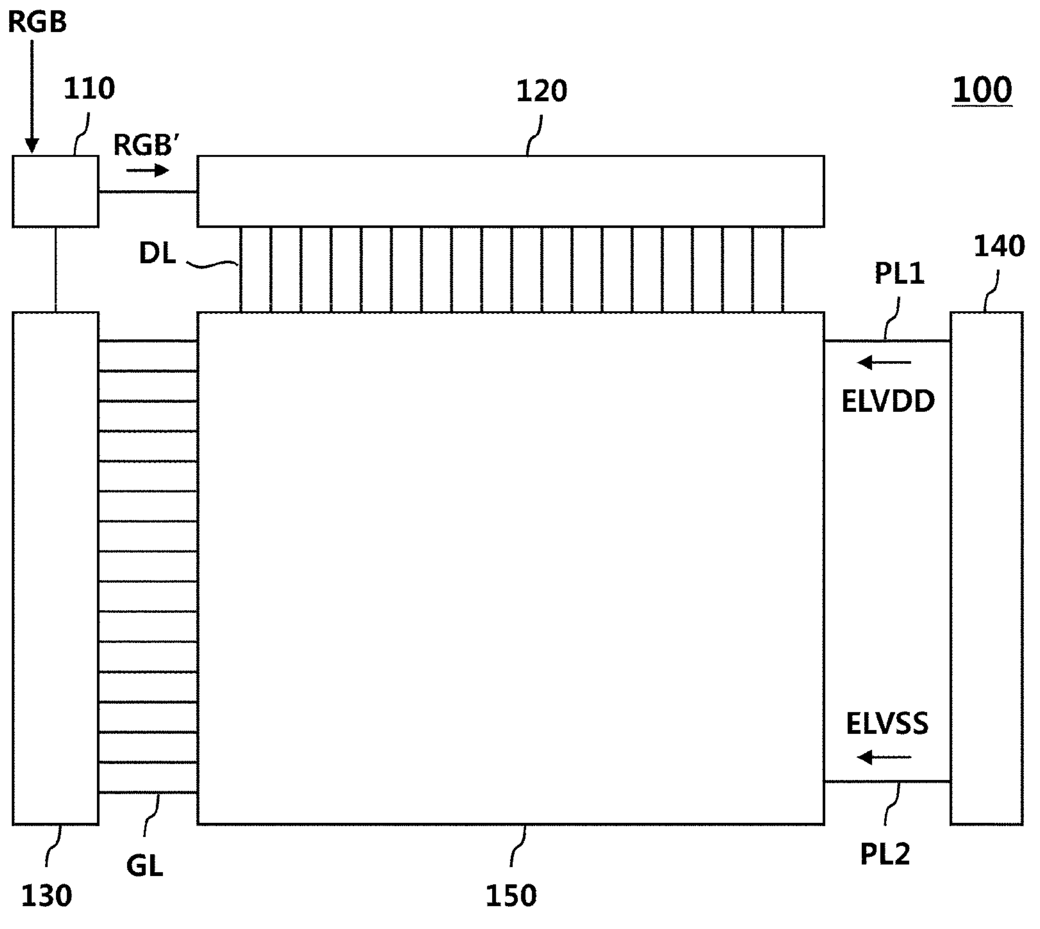
FIG. 1 is a configuration diagram of a display device according to an embodiment.

FIG. 1 is a configuration diagram of a display device according to an embodiment.

Referring to FIG. 1, a display device 100 may comprise an image data processing device 110, a panel driving device 120, a gate driving device 130, a power management device 140, and a panel 150.

The image data processing device 110 may receive image data RGB from outside, for example, from a host device, convert the image data RGB, and transmit a converted image data RGB' to the panel driving device 120.

The panel driving device 120 may receive the converted image data RGB', generate an analog voltage, a so-called data voltage, using the converted image data RGB', and then, supply the analog voltage to each pixel disposed on the panel 150 through a data line DL.

On the panel 150, a plurality of pixels may be disposed. Each pixel may be a self-light-emitting pixel. For example, each pixel may comprise an organic light emitting diode and emit light by itself by a driving current supplied to the organic light emitting diode. The brightness (luminance) of each pixel may be controlled by a driving voltage ELVDD, ELVSS supplied from the power management device 140 and an analog voltage supplied from the panel driving device 120.

The power management device 140 may supply driving voltages ELVDD, ELVSS to the panel 150. The driving voltages ELVDD, ELVSS may be divided into a driving high voltage ELVDD and a driving low voltage ELVSS and the power management device 140 may generate driving high voltages ELVDD and driving low voltages ELVSS by converting power suppled from outside. The power management device 140 may supply a driving high voltage ELVDD to the panel 150 through a first power line PL1 and a driving low voltage ELVSS to the panel 150 through a second power line PL2. In the first power line PL1 and the second power line PL2, there may be line resistances. Due to such line resistances, a voltage drop may occur. As generally known, when a current level is low, the voltage drop due to the line resistance may be small, and when a current level is high, the voltage drop due to the line resistance may be great.

The gate driving device 130 may supply a scan signal to the panel through a gate line GL. According to a scan signal, a specific line is selected in the panel 150 and an analog voltage may be supplied from the panel driving device 120 to a pixel connected with the selected line. The image data processing device 110 may supply a synchronization signal and/or a control signal to the panel driving device 120, the gate driving device 130, and the power management device 140 to control the timing for supplying a scan signal and the timing for supplying an analog voltage.

The image data processing device 110 may be referred to as a timing controller, the panel driving device 120 may be referred to as a source driver or a column driver, and the gate driving device 130 may be referred to as a gate driver. Each device may be formed in an independent integrated circuit or two or more devices may be formed in one integrated circuit.

The brightness of each pixel may be controlled by a driving voltage ELVDD, ELVSS supplied from the power management device 140 and an analog voltage supplied from the panel driving device 120. However, if there is a voltage drop in a power line PL1, PL2 through which a driving voltage ELVDD, ELVSS is supplied, a pixel may be driven at an undesired brightness.

Figure 2:
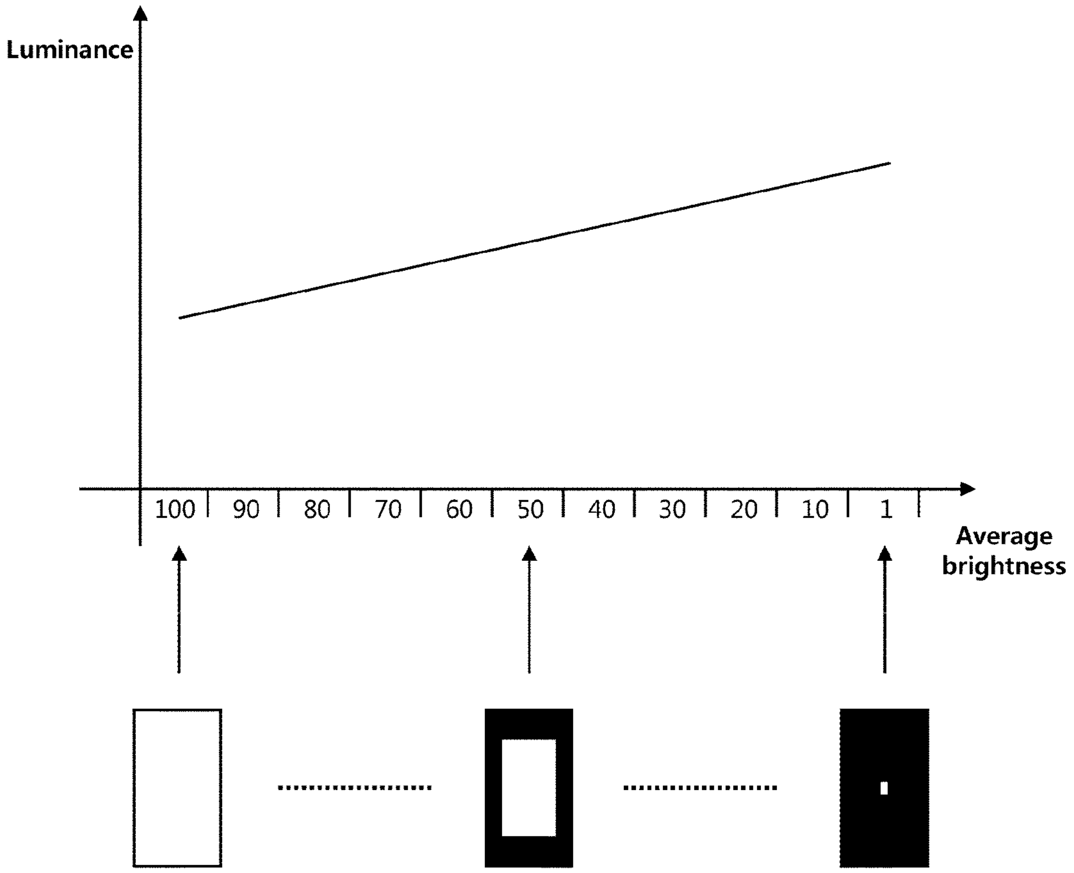
FIG. 2 is a graph showing a relation between the average brightness of an image and the luminance of a pixel emitting light of a general display device.

FIG. 2 is a graph showing a relation between the average brightness of an image and the luminance of a pixel emitting light of a general display device.

Referring to FIG. 2, it can be seen that, in a general display device, the luminance of a light emitting pixel increases as the average brightness of an image decreases.

Since a current, flowing into a power line through which a driving voltage is supplied, is reduced as the average brightness of an image decreases, a voltage drop in the power line decreases and this results in supplying a voltage higher than a desired driving voltage to the panel. Even when an analog voltage, corresponding to a same grayscale value, is supplied to a pixel, if a driving voltage, in particular, a driving high voltage increases, the luminance increases. The increase of the luminance of a pixel may be a cause of degradation of image quality as well as a cause of acceleration of deterioration of the pixel.

Meanwhile, as shown in FIG. 2, the average brightness of an image decreases as the ON rate of a pixel decreases. Because of such a characteristic, the luminance of a pixel may be appropriately adjusted by calculating an ON rate of the pixel and adjusting image data or an analog voltage according to the ON rate. For example, as the ON rate is lower, a grayscale value of image data may be adjusted to be lower in order that the luminance of a pixel has an appropriate value. However, since an average brightness of an image or a characteristic of an image displayed on the panel is not determined only by the ON rate, such a method has a certain limit.

Figure 3:
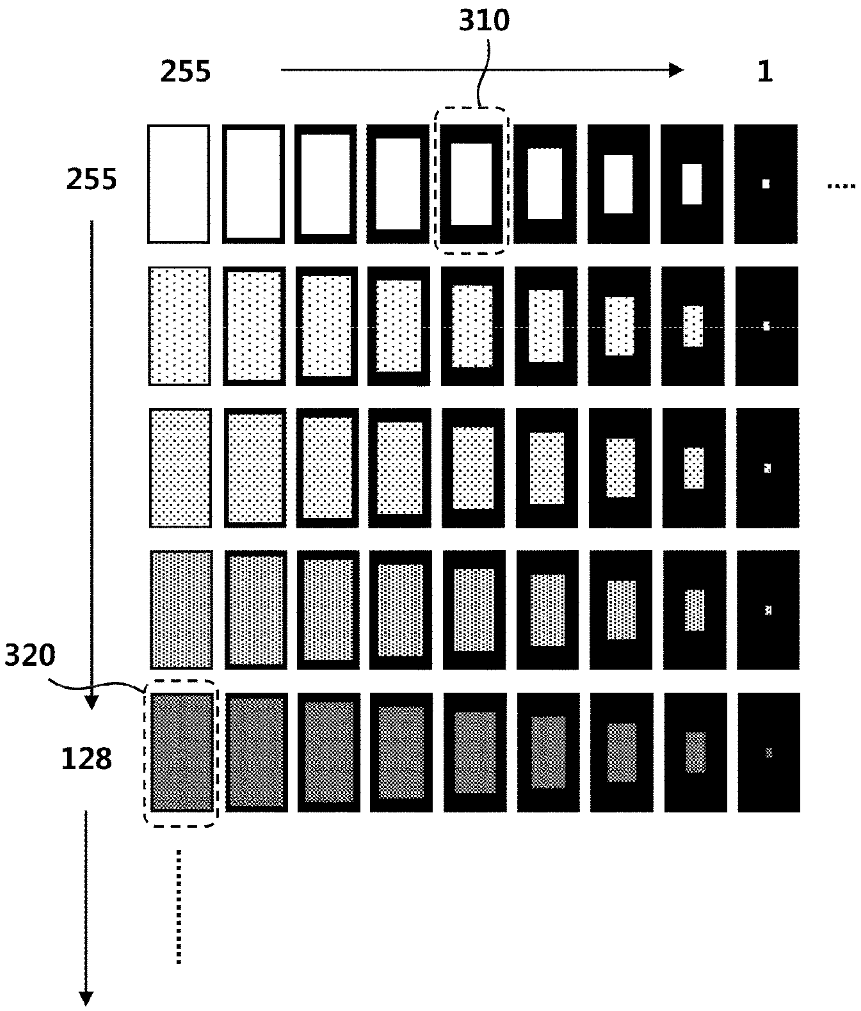
FIG. 3 is a diagram showing various types of images displayed on a panel.

FIG. 3 is a diagram showing various types of images displayed on a panel.

FIG. 3 shows image types according to ON rates of pixels in a horizontal direction and image types according to grayscale values of pixels which are turned-on in a vertical direction.

Referring to FIG. 3, an average brightness of a first image 310, of which an ON rate is about 50% and a grayscale value of a turned-on pixel is 255, may be 128. Additionally, an average brightness of a second image 320, of which an ON rate is 100% and a grayscale value of a turned-on pixel is 128, may also be 128. According to a control method described referring to FIG. 2, the display device may control the luminance of pixels for the first image 310 to be lowered to a predetermined level but may not adjust the luminance of a pixel for the second image 320. Practically, since the average brightness of the second image 320 is lowered, the luminance of the pixels may increase by a certain amount. However, according to the control method described referring to FIG. 2, such an increase in the luminance cannot be prevented.

In both the first image 310 and the second image 320, the increase in the luminance due to the decrease in the average brightness may occur. However, since image types or image characteristics of the first image 310 and the second image 320 are different, the increase in amounts of the luminance may be different. In a display device according to an embodiment, image data is compensated according to an image type, so that the image data compensation suitable to various image types may be performed.

The types of two-dimensional images shown in FIG. 3 may be indicated by a plurality of representative values representing the luminance of pixels. For example, first representative values may indicate types of images arranged along a horizontal axis and second representative values may indicate types of images arranged along a vertical axis. A display device may identify a type or a characteristic of an image using a first representative value and a second representative value.

Figure 4:
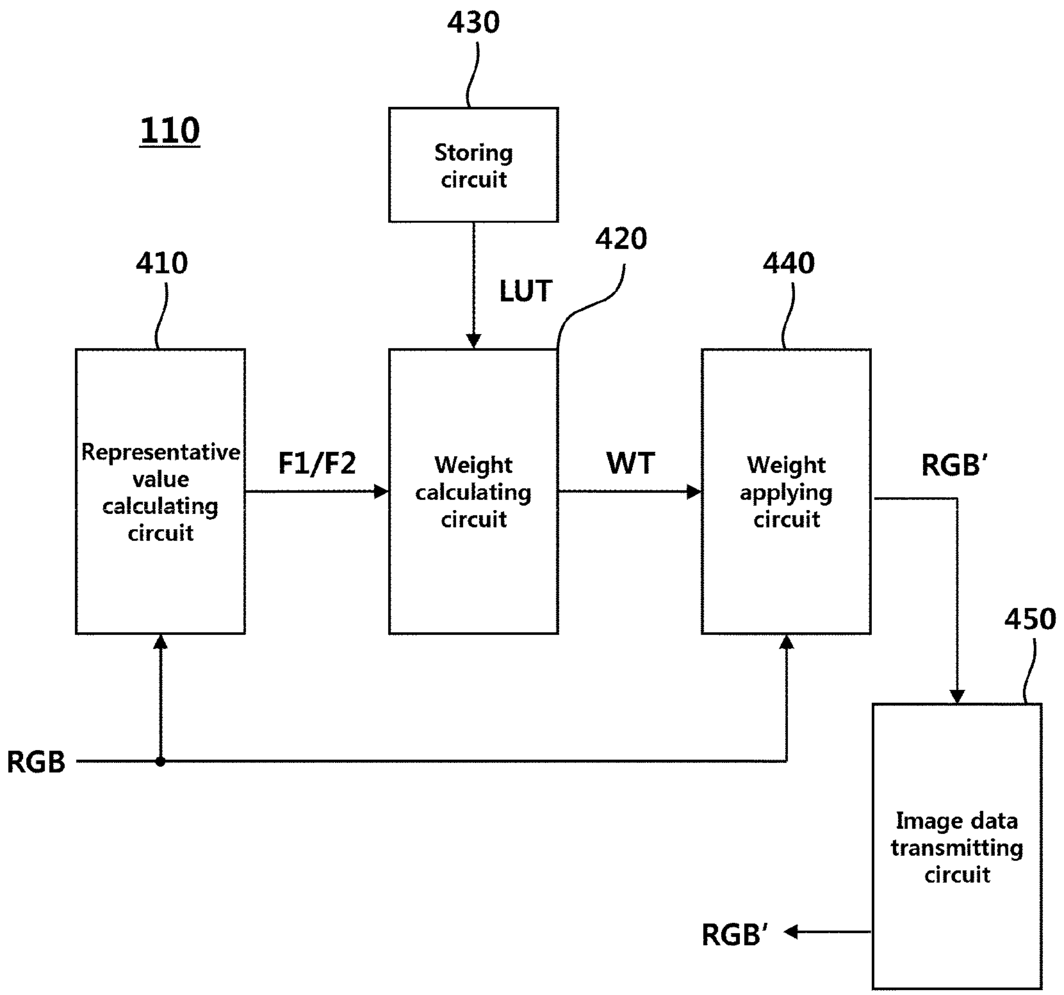
FIG. 4 is a configuration diagram of an image data processing device according to an embodiment.

FIG. 4 is a configuration diagram of an image data processing device according to an embodiment.

Referring to FIG. 4, an image data processing device 110 may comprise a representative value calculating circuit 410, a weight calculating circuit 420, a storing circuit 430, a weight applying circuit 440, and an image data transmitting circuit 450.

The representative value calculating circuit 410, calculating representative values which represent the luminance of pixels disposed on the panel, may calculate a first representative value F1 from image data RGB according to a first method and a second representative value F2 from image data RGB according to a second method.

The storing circuit 430 may store a lookup table LUT comprising at least two axes and the weight calculating circuit 420 may calculate a weight WT using a value corresponding to the first representative value F1 in a first axis of the lookup table LUT and to the second representative value F2 in a second axis thereof.

The weight applying circuit 440 may generate a converted image data RGB' by applying a weight WT to image data RGB.

The image data transmitting circuit 450 may transmit the converted image data RGB' to the panel driving device.

The first representative value F1 and the second representative value F2 may represent different characteristics of an image.

Figure 5:
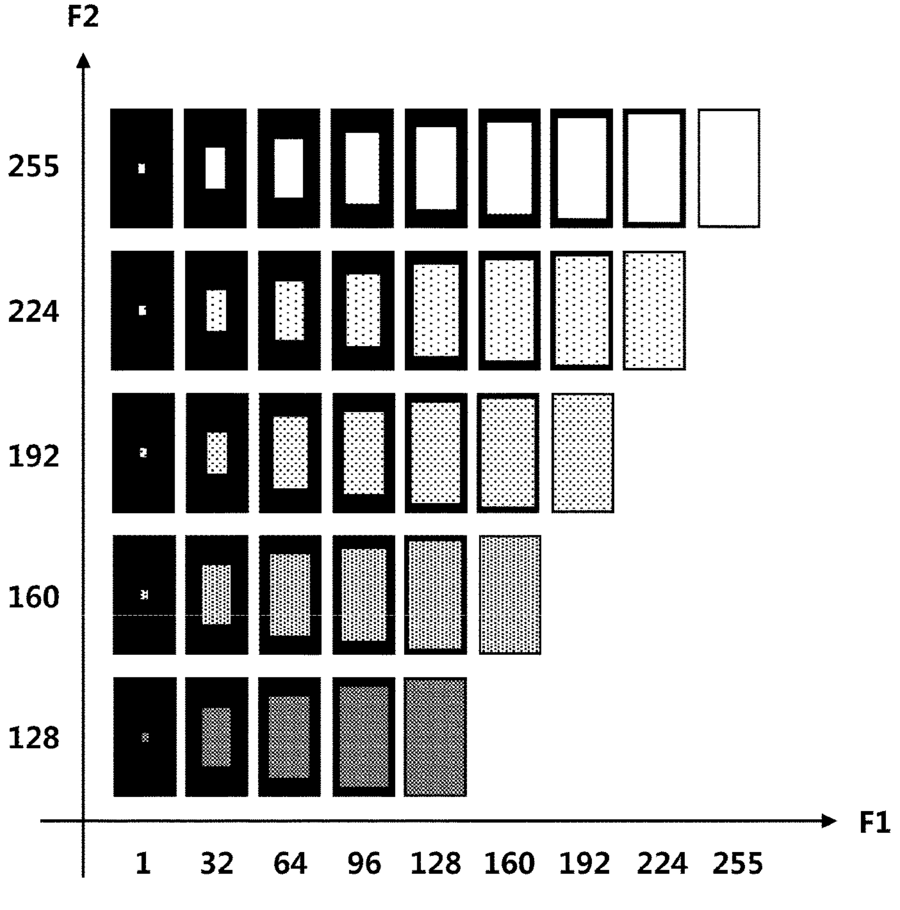
FIG. 5 is a diagram showing an example of a classification of image types according to first representative values and second representative values.

FIG. 5 is a diagram showing an example of a classification of image types according to a first representative value and a second representative value.

Referring to FIG. 5, the first representative value may increase as the number of pixels, having brightness (pixels which are turned on) among pixels disposed on the panel, increases. The second representative value may increase as grayscale values of pixels, having brightness (pixels which are turned on), increase. When disposing images along a horizontal axis corresponding to the first representative values and a vertical axis corresponding to the second representative values, various images may be classified as shown in FIG. 5. In a display device according to an embodiment, types or characteristics of images may be minutely identified using the first representative values and the second representative values.

When a type or characteristic of an image is identified, a weight suitable for the corresponding image may be searched and applied to image data so that the luminance of the relevant pixel may be compensated. Weights suitable for types or characteristics of respective images may be previously measured and stored in a memory in a form of a lookup table.

Figure 6:
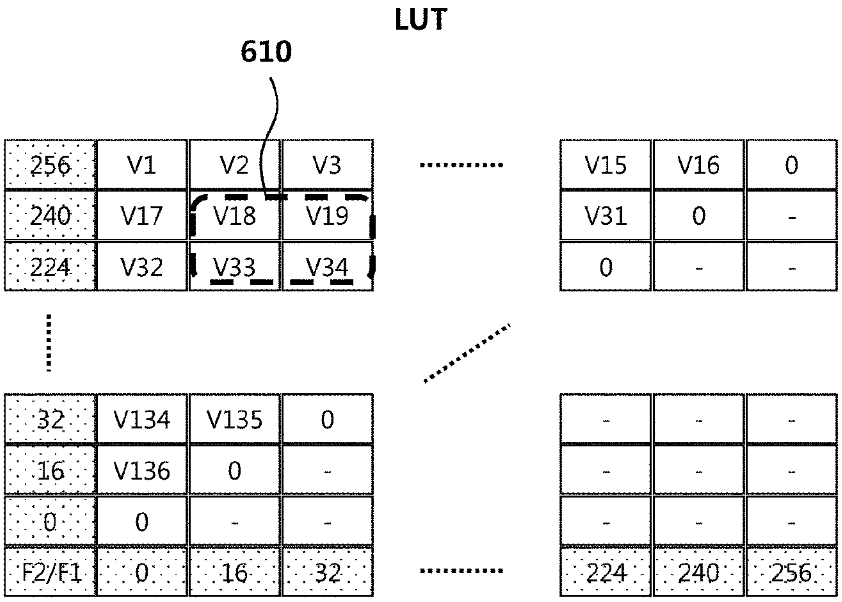
FIG. 6 is a diagram showing an example of a lookup table according to an embodiment.

FIG. 6 is a diagram showing an example of a lookup table according to an embodiment.

Referring to FIG. 6, a lookup table LUT may be a two-dimensional table having two axes. A first axis (a horizontal axis in FIG. 6) may correspond to first representative values and a second axis (a vertical axis in FIG. 6) may correspond to second representative values.

In the lookup table LUT, weights V1-V136 may be placed only on the left in relation to a diagonal line. Such an example may appear when the second representative values of all types of images are always greater than or equal to the first representative values thereof.

In the lookup table LUT, first representative values and second representative values respectively have appropriate gradation intervals between them considering the size of the memory and the weights V1-V136 may be stored in this lookup table LUT. The image data processing device may calculate a weight by selecting four candidate values proximate to a pair of calculated first and second representative values from the lookup table LUT and applying the interpolation to the four candidate values. For example, in a case when the first representative value is 18 and the second representative value is 230, the image processing device may select four candidate values V18, V19, V33, V34 corresponding to a first area 610 from the lookup table LUT and apply the interpolation to the four candidate value V18, V19, V33, V34 to calculate a weight.

In the lookup table LUT, the intervals of a first axis and a second axis may respectively be $2^K$ (K is a natural number). According to such configuration, a circuit may be simplified by replacing the division of the interpolation with the bit shift.

Figure 7:
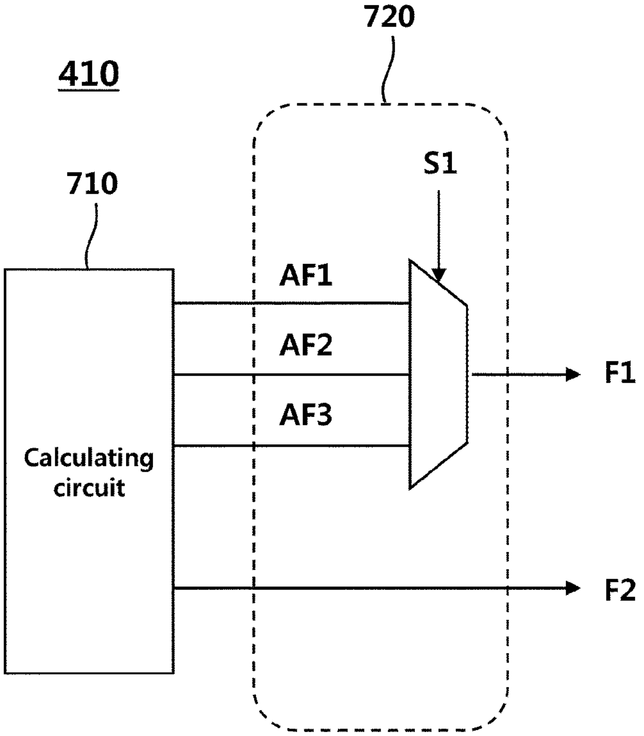
FIG. 7 is a configuration diagram of a representative value calculating circuit according to an embodiment.

FIG. 7 is a configuration diagram of a representative value calculating circuit according to an embodiment.

Referring to FIG. 7, a representative value calculating circuit 410 may comprise a calculating circuit 710 and a selecting circuit 720.

The calculating circuit 710 may calculate a plurality of representative values.

The calculating circuit 710 may calculate a plurality of candidate representative values AF1-AF3, which can be a first representative value F1. The selecting circuit 720 may select one of the plurality of the candidate representative values AF1-AF3 according to a selection value S1 to generate a first representative value F1.

The calculating circuit 710 may calculate a first candidate representative value AF1 or a second candidate representative value AF2 using an equation comprising, as a factor, a simple equation of grayscale values for pixels or grayscale values for sub-pixels forming a pixel.

For example, the calculating circuit 710 may calculate the first candidate representative value AF1 using, as a factor, a pixel grayscale value Y obtained by calculating a weighted average of grayscale values of a red (R) sub-pixel, a green (G) sub-pixel, and a blue (B) sub-pixel.

Equation 1 is an exemplary equation for calculating the first candidate representative value AF1.

$$AF1=\text{avg}(Y), Y=a*R+b*G+c*B \quad \text{[Equation 1]}$$

Here, R is a grayscale value of an R sub-pixel forming a pixel, G is a grayscale value of a G sub-pixel forming a pixel, and B is a grayscale value of a B sub-pixel forming a pixel. Additionally, a is a weight for the grayscale value of the R sub-pixel, b is a weight for the grayscale value of the G sub-pixel, c is a weight for the grayscale value of the B sub-pixel, and they may have a relation of a+b+c=1.

For another example, the calculating circuit 710 may calculate the second candidate representative value AF2 using the maximum value of averages of grayscale values of the sub-pixels.

Equation 2 is an exemplary equation for calculating the second candidate representative value AF2.

$$AF2=\text{MAX}(\text{avg}(R),\text{avg}(G),\text{avg}(B)) \quad \text{[Equation 2]}$$

The calculating circuit 710 may calculate a second representative value F2 using, as a factor, a quadratic equation of grayscale values for pixels or grayscale values for sub-pixels forming a pixel. For example, the calculating circuit 710 may calculate the second representative value F2 by dividing the maximum value, among a first square sum obtained by summing up the squares of grayscale values of R sub-pixels, a second square sum obtained by summing up the squares of grayscale values of G sub-pixels, and a third square sum obtained by summing up the squares of grayscale values of B sub-pixels, by the maximum value, among a first sum obtained by summing up the grayscale values of R sub-pixels, a second sum obtained by summing up the grayscale values of G sub-pixels, and a third sum obtained by summing up the grayscale values of B sub-pixels.

Meanwhile, the calculating circuit 710 may calculate a second representative value F2 by selecting the maximum value among values, each obtained by dividing a sum of the squares of grayscale values of each sub-pixel by a sum of the grayscale values thereof. However, when comparing this method of calculating a second representative value F2 with the aforementioned method of calculating a second representative value F2, the aforementioned method uses one divider, whereas this method uses the number, corresponding to the number of sub-pixels, of dividers, for example 3 dividers, and therefore, the aforementioned method may be advantageous in terms of the size of a chip.

In addition, the calculating circuit 710 may calculate the third candidate representative value AF3 by dividing the maximum value, among a first square sum obtained by summing up the squares of grayscale values of R sub-pixels, a second square sum obtained by summing up the squares of grayscale values of G sub-pixels, and a third square sum obtained by summing up the squares of grayscale values of B sub-pixels, by 2^M (M is the number of bits of data indicating a grayscale value) and dividing its result by the total number of pixels.

The representative value calculating circuit 410 may calculate representative values for pixels or representative values for the respective sub-pixels. Calculating representative values for pixels may be referred to as a white mode and calculating representative values for the respective sub-pixels may be referred to as an RGB mode.

In the RGB mode, the representative value calculating circuit 410 may calculate a first representative value F1 and a second representative value F2 for the respective sub-pixels R, G, B, the weight calculating circuit (see 420 in FIG. 4) may calculate weights for the respective sub-pixels R, G, B, and the weight applying circuit (see 440 in FIG. 4) may apply the weights for the respective sub-pixels R, G, B.

In the RGB mode, a first candidate representative value AF1 for each sub-pixel may be an average grayscale value for each sub-pixel. For example, in the RGB mode, the following relations may be formed: AF1(R)=avg(R), AF1(G)=avg(G), AF1(B)=avg(B).

In the RGB mode, a second representative value F2 may be calculated by dividing a sum of the squares of grayscale values of each sub-pixel by a sum of the grayscale values thereof. For example, the following relations may be formed: F2(R)=sum(R^2)/sum(R), F2(G)=sum(G^2)/sum(G), F2(B)=sum(B^2)/sum(B).

Additionally, in the RGB mode, a third candidate representative value AF3 may be calculated by dividing a sum of the squares of grayscale values of each sub-pixel by 2^M (M is the number of bits of data indicating a grayscale value) and dividing its result by the total number of each type of sub-pixels.

On the other hand, there can be a mixed mode of the white mode and the RGB mode. In the mixed mode, the representative value calculating circuit 410 may calculate representative values for the respective sub-pixels and transmit them to the weight calculating circuit (see 420 in FIG. 4), the weight calculating circuit (see 420 in FIG. 4) may calculate weights for the respective sub-pixels and combine calculated weights to calculate a final weight.

Figure 8:
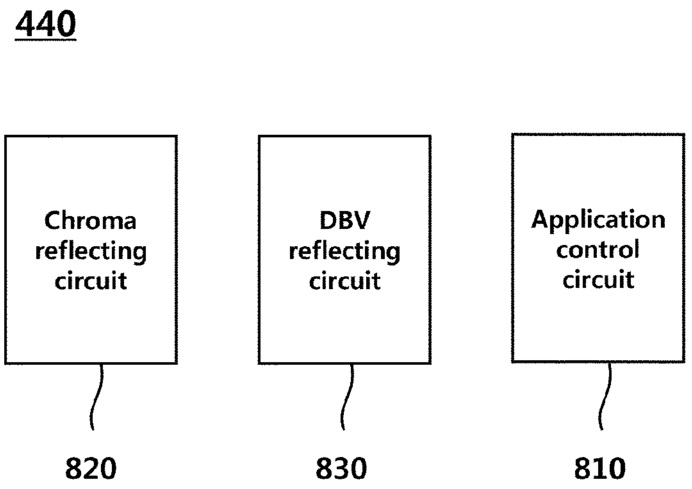
FIG. 8 is a configuration diagram of a weight applying circuit according to an embodiment.

FIG. 8 is a configuration diagram of a weight applying circuit according to an embodiment.

Referring to FIG. 8, a weight applying circuit may comprise an application control circuit 810, a chroma reflecting circuit 820, and a display brightness value (DBV) reflecting circuit 830.

The chroma reflecting circuit 820 and the DBV reflecting circuit 830 are optional, and thus, when the chroma reflecting circuit 820 and the DBV reflecting circuit 830 are not used, the application control circuit 810 may multiply a grayscale value for each pixel included in image data by a weight to generate converted image data.

When the chroma reflecting circuit 820 is used, the application control circuit 810 may apply a weight to image data using a first reflection rate calculated by the chroma reflecting circuit 820.

The chroma reflecting circuit 820 may calculate the first reflection rate according to chroma. For example, when chroma is high, the chroma reflecting circuit 820 may calculate a first reflection rate for a weight to be high. When chroma is low to the point of being achromatic, the chroma reflecting circuit 820 may calculate a first reflection rate for a weight to be high.

The chroma reflecting circuit 820 may calculate a chroma analysis value and calculate a first reflection rate by putting the chroma analysis value into a pre-stored reflection rate curve.

The chroma reflecting circuit 820 may calculate the chroma analysis value by calculating a difference between the biggest grayscale value of a sub-pixel and the smallest grayscale value of a sub-pixel for each pixel, summing up such differences of grayscale values of all the pixels to obtain a sum, and dividing a sum by the number of achromatic-colored ones among all the pixels.

Here, the chroma reflecting circuit 820 may determine a pixel comprising sub-pixels having the same grayscale values as an achromatic-colored pixel and a pixel comprising at least one sub-pixel having a grayscale value different from those of the others as a chromatic-colored pixel.

Figure 9:
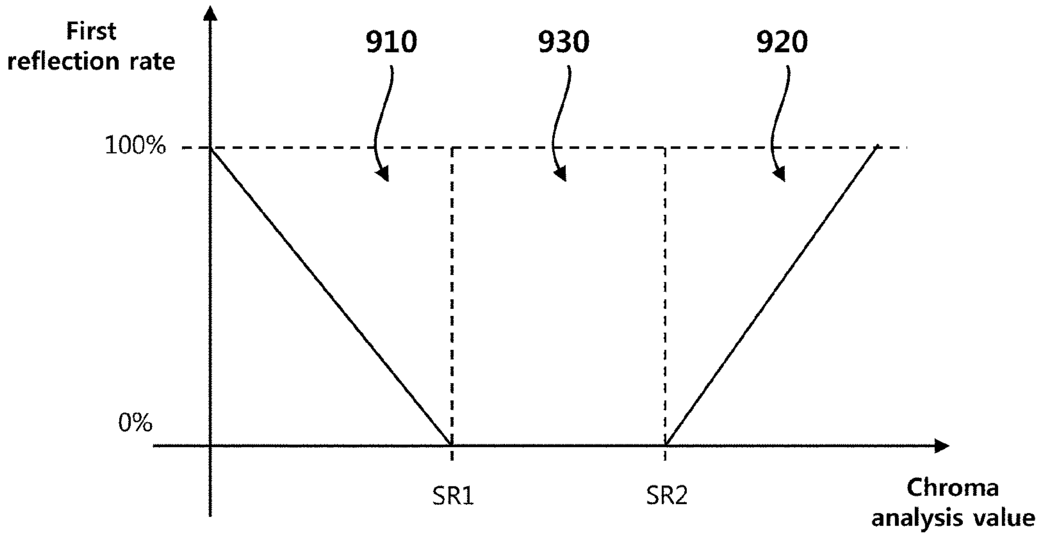
FIG. 9 is a graph showing an example of a curve of a first reflection rate according to a chroma analysis value.

FIG. 9 is a graph showing an example of a curve of a first reflection rate according to a chroma analysis value.

Referring to FIG. 9, the curve may be set to have a first reflection rate no less than 0 in a low chroma area 910 and a high chroma area 920 and to have a first reflection rate of 0 in a medium chroma area 930.

According to such a curve, the weight applying circuit may apply a weight only in the low chroma area 910 or the high chroma area 920, but no weight in the medium chroma area 930.

A first set value SR1 indicating the low chroma area 910 and a second set value SR2 indicating the high chroma area 920 may be set as register values. The weight applying circuit may calculate a first reflection rate using a linear interpolation in the low chroma area 910 and the high chroma area 920. Here, in order to use the bit shift method instead of the division, the first set value SR1 and the second set value SR2 may have values of $2^K$ (K is a natural number).

Referring again to FIG. 8, when the first reflection rate is calculated by the chroma reflection circuit 820, the application control circuit 810 may apply a weight to image data at the first reflection rate but may not apply the weight to the rest. For example, when the first reflection rate is 50%, the weight is 0.5, and the grayscale value is 128, a converted grayscale value can be calculated as follows.

Converted grayscale value=grayscale value 128*first reflection rate 50%*weight 0.5+grayscale value 128*(1−first reflection rate)=32+64=96

When the DBV reflection circuit 830 is used, the application control circuit 810 may apply a weight to image data using a second reflection rate calculated in the DBV reflection circuit 830.

The DBV reflection circuit 830 may calculate a second reflection rate according to a DBV determined by a user or a host. For example, the DBV reflection circuit 830 may calculate the second reflection rate to be high as the DBV is high.

Figure 10:
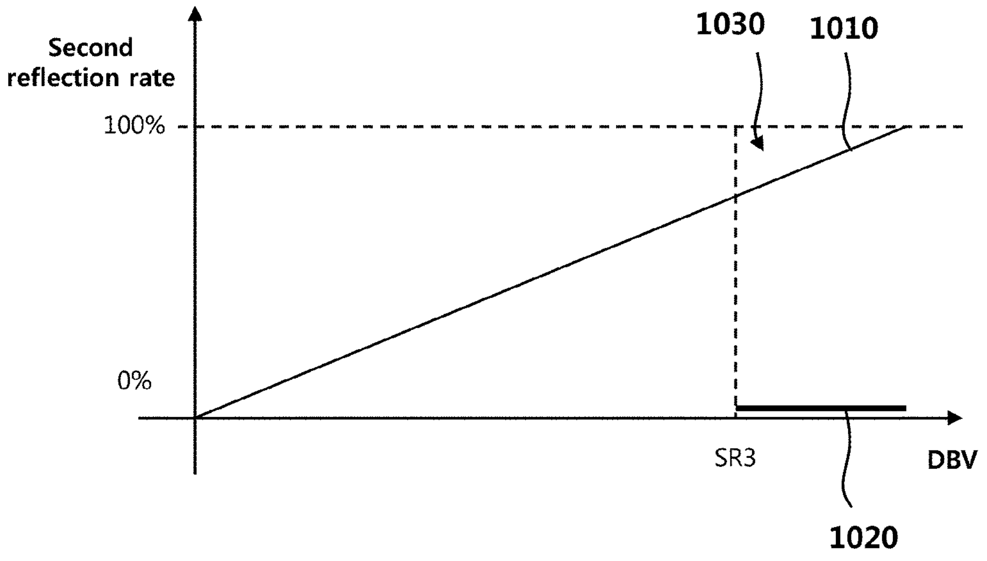
FIG. 10 is a graph showing an example of a curve of a second reflection rate according to a display brightness value (DBV).

FIG. 10 is a graph showing an example of a curve of a second reflection rate according to a display brightness value (DBV).

Referring to FIG. 10, a curve 1010 may show a form in which the second reflection rate increases as a DBV increases.

According to the curve 1010, the weight applying circuit may apply a high rate of a weight as a DBV is high and a low rate of a weight as a DBV is low.

An area 1030 where a DBV is equal to or higher than a third set value SR3 is referred to as an HBM area. When a DBV belongs to the HBM area, a display device may display a warning message, for example, that, since the brightness of a panel is too high, this may cause the deterioration of eyesight. In a case when a user chooses the HBM area in spite of such a warning message, it would be advisable in terms of policy not to apply the luminance reduction by a weight. Accordingly, when a DBV is no less than a predetermined value (a third set value), the weight applying circuit may use image data as it is without applying a weight to generate converted image data.

Referring again to FIG. 8, when a second reflection rate is calculated by the DBV reflection circuit 830, the application control circuit 810 may apply a weight to image data at the second reflection rate, but may not apply the weight to the rest. For example, when the second reflection rate is 50%, the weight is 0.5, and the grayscale value is 128, a converted grayscale value can be calculated as follows.

Converted grayscale value=grayscale value 128*second reflection rate 50%*weight 0.5+grayscale value 128*(1−second reflection rate)=32+64=96

The application control circuit 810 may simultaneously apply the first reflection rate and the second reflection rate. For example, the first reflection rate and the second reflection rate are respectively 50%, the weight is 0.5, and the grayscale value is 128, a converted grayscale value can be calculated as follows.

Converted grayscale value=grayscale value 128*first reflection rate 50%*second reflection rate 50%*weight 0.5+grayscale value 128*(1−first reflection rate*second reflection rate)=16+96=112

As described above, the present disclosure allows reducing the change of the brightness of pixels to improve image quality. In addition, the present disclosure allows reducing the change of the brightness of pixels even when driving voltages or driving environments vary and reducing the change of the brightness of pixels depending on image data or image types.

What is claimed is:

1. A method of processing image data, the method comprising:

calculating at least one representative value representing luminance of pixels disposed on a panel;

calculating a weight by using the at least one representative value;

calculating a reflection rate of the weight by analyzing a chroma of image data;

generating converted image data by applying the weight to the image data at the reflection rate; and transmitting the converted image data to a panel driving device for driving the panel.

2. The method of processing image data of claim 1, wherein the reflection rate is calculated by calculating a chroma analysis value for the image data and applying the chroma analysis value to a reflection rate curve that was previously stored.

3. The method of processing image data of claim 2, wherein the chroma analysis value is calculated by calculating a difference between a largest grayscale value and a smallest grayscale value of sub-pixels of each of the pixels, obtaining a sum by summing up differences of grayscale values regarding all the pixels, and dividing the sum by a total number of achromatic-colored pixels.

4. The method of processing image data of claim 3, wherein a pixel comprising sub-pixels having same grayscale values is determined as an achromatic-colored pixel from the achromatic-colored pixels.

5. The method of processing image data of claim 2, wherein the reflection rate curve has a characteristic that the reflection rate decreases as the chroma analysis value increases when the chroma analysis value is no more than a first reference value.

6. The method of processing image data of claim 1, wherein, in calculating the reflection rate, the reflection rate is calculated to be high when the chroma is high.

7. The method of processing image data of claim 1, wherein the reflection rate is calculated to be high when chroma is low to a point of being achromatic.

8. The method of processing image data of claim 1, wherein calculating the reflection rate comprises calculating a chroma analysis value for the image data, and subsequently, the reflection rate is calculated to be no less than 0 when the chroma analysis value belongs to a low chroma area and a high chroma area, and the reflection rate is calculated to be 0 when the chroma analysis value belongs to in an area between the low chroma area and the high chroma area.

9. The method of processing image data of claim 1, in calculating at least one representative value, as values representing luminance of pixels disposed on a panel, a first representative value is calculated from image data according to a first method and a second representative value is calculated from the image data according to a second method that is different from the first method; and in calculating a weight, a value derived by applying the first representative value and the second representative value to a lookup table is used.

10. The method of processing image data of claim 9, wherein, in the lookup table, intervals of one axis and another axis are respectively $2^K$ (K is a natural number).

11. The method of processing image data of claim 9, wherein the first representative value increases as a number of pixels having brightness of pixels being turned on increases.

12. The method of processing image data of claim 9, wherein the second representative value increases as grayscale values of pixels having brightness of pixels being turned on increases.

13. The method of processing image data of claim 9, wherein the first representative value, the second representative value, and the weight are calculated respectively according to types of sub-pixels forming a pixel from the pixels.

14. An image data processing device comprising:

a representative value calculating circuit configured to calculate at least one representative value representing luminance of pixels disposed on a panel;

a weight calculating circuit configured to calculate a weight by using the at least one representative value;

a weight applying circuit configured to calculate a reflection rate of the weight by analyzing a chroma of image data and to apply the weight to the image data at the reflection rate to generate converted image data; and an image data transmitting circuit to transmit the converted image data to a panel driving device to drive the panel.

15. The image data processing device of claim 14, wherein the weight applying circuit calculates the reflection rate by calculating a chroma analysis value for the image data and applying the chroma analysis value to a reflection rate curve that was previously stored.

16. The image data processing device of claim 15, wherein the weight applying circuit calculates the chroma analysis value by calculating a difference between a largest grayscale value and a smallest grayscale value of sub-pixels of each of the pixels, obtaining a sum by summing up differences of grayscale values regarding all pixels, and dividing the sum by a total number of achromatic-colored pixels.

17. The image data processing device of claim 15, wherein the reflection rate curve has a characteristic that the reflection rate decreases as the chroma analysis value increases when the chroma analysis value is no more than a first reference value.

18. The image data processing device of claim 14, wherein the weight applying circuit calculates a chroma analysis value for the image data, and subsequently, calculates the reflection rate to be no less than 0 when the chroma analysis value belongs to a low chroma area and a high chroma area, and calculates the reflection rate to be 0 when the chroma analysis value belongs to in an area between the low chroma area and the high chroma area.

19. The image data processing device of claim 14, wherein the representative value calculating circuit calculates, as values representing luminance of pixels disposed on a panel, a first representative value from image data according to a first method and a second representative value from the image data according to a second method that is different from the first method; and the weight calculating circuit calculates the weight by using a value derived by applying the first representative value and the second representative value to a lookup table.

20. The image data processing device of claim 14, wherein the panel is a self-light-emitting display panel.

* * * * *